United States Patent
Nielsen et al.

(10) Patent No.: US 7,302,603 B2
(45) Date of Patent: Nov. 27, 2007

(54) HOST-INITIATED DATA RECONSTRUCTION FOR IMPROVED RAID READ OPERATIONS

(75) Inventors: Karl A. Nielsen, Tucson, AZ (US); Colleen R. Stouffer, Austin, TX (US); Matthew J. Fairhurst, Winchester (GB); Lee J. Sanders, Havant (GB)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/719,180

(22) Filed: Nov. 20, 2003

(65) Prior Publication Data

US 2005/0114729 A1 May 26, 2005

(51) Int. Cl.
*G06F 11/00* (2006.01)

(52) U.S. Cl. .......................................... 714/6
(58) Field of Classification Search ................ 714/770, 714/6
See application file for complete search history.

(56) References Cited

U.S. PATENT DOCUMENTS

| | | | | |
|---|---|---|---|---|
| 5,233,618 A * | 8/1993 | Glider et al. ................... | 714/6 |
| 5,504,858 A * | 4/1996 | Ellis et al. ...................... | 714/6 |
| 5,588,012 A * | 12/1996 | Oizumi ........................ | 714/805 |
| 5,619,644 A * | 4/1997 | Crockett et al. ............... | 714/45 |
| 5,655,150 A * | 8/1997 | Matsumoto et al. .......... | 710/17 |
| 5,717,850 A * | 2/1998 | Apperley et al. ............... | 714/6 |
| 5,790,774 A * | 8/1998 | Sarkozy ......................... | 714/6 |
| 5,838,892 A * | 11/1998 | Wilson ........................... | 714/6 |
| 6,023,780 A * | 2/2000 | Iwatani ........................ | 714/770 |
| 6,070,249 A * | 5/2000 | Lee ................................ | 714/6 |
| 6,154,853 A * | 11/2000 | Kedem ........................... | 714/6 |
| 6,397,347 B1 * | 5/2002 | Masuyama et al. ............ | 714/5 |
| 6,678,107 B1 * | 1/2004 | Krehbiel et al. .............. | 360/53 |
| 7,020,835 B2 * | 3/2006 | Loaiza et al. ................ | 714/807 |
| 2002/0038406 A1 * | 3/2002 | Shirai et al. ................ | 711/137 |
| 2002/0038436 A1 * | 3/2002 | Suzuki ........................... | 714/6 |
| 2002/0049950 A1 * | 4/2002 | Loaiza et al. ............... | 714/763 |
| 2003/0145270 A1 * | 7/2003 | Holt ............................ | 714/766 |
| 2003/0229820 A1 * | 12/2003 | Chatterjee et al. ............ | 714/7 |
| 2004/0250019 A1 * | 12/2004 | Fujie et al. .................. | 711/114 |
| 2004/0268178 A1 * | 12/2004 | Fredin ............................ | 714/6 |

* cited by examiner

*Primary Examiner*—Bryce P Bonzo
(74) *Attorney, Agent, or Firm*—Dan Shifrin

(57) ABSTRACT

Method, system and computer program product are provided to improve the reliability of data transfers from RAID systems. Although some read errors may be detected by the RAID controller, other errors may not be; undetected errors may affect the integrity of the data. In accordance with the present invention, the host or client issues a first command to the RAID controller to read specified data. After the RAID controller obtains the data from the RAID drives and transmits it to the host, the host verifies the data to detect any errors. If an error is detected by the host, the host issues a second command to the RAID controller to reconstruct the specified data, rather than merely re-read the data. The reconstructed data is then transmitted to the host. Consequently, previously undetected and uncorrected errors may be detected and corrected by the host.

28 Claims, 2 Drawing Sheets

HOST-INITIATED DATA RECONSTRUCTION FOR IMPROVED RAID READ OPERATIONS

RELATED APPLICATIONS

This application incorporates by reference commonly assigned and co-pending U.S. patent application Ser. No. 10/719,213, entitled RECOVERING TRACK FORMAT INFORMATION MISMATCH ERRORS USING DATA RECONSTRUCTION, filed on Nov. 20, 2003.

TECHNICAL FIELD

The present invention relates generally to RAID storage systems and, in particular, to improving the integrity of read operations.

BACKGROUND ART

In a non-RAID computer system, if a disk drive fails, all or part of the stored customer data may be permanently lost (or possibly partially or fully recoverable but at some expense and effort). Although backup and archiving devices and procedures may preserve all but the most recently saved data, there are certain applications in which the risk of any data loss and the time required to restore data from a backup copy is unacceptable. Therefore, RAID ("redundant array of inexpensive disks") storage subsystems are frequently used to provide improved data integrity and device fault tolerance. If a drive in a RAID system fails, the entire data may be quickly and inexpensively recovered.

There are numerous methods of implementing RAID systems. Such methods are commonly known in the industry and only a few will be described, and only generally, herein. A very basic RAID system, RAID level 1, employs simple mirroring of data on two parallel drives. If one drive fails, customer data may be read from the other. In RAID level 2, bits of a data word are written to separate drives, with ECC (error correction code) being written to additional drives. When data is read, the ECC verifies that the data is correct and may correct incorrect data caused by the failure of a single drive. In RAID 3, data blocks are divided and written across two or more drives. Parity information is written to another, dedicated drive. Similar to RAID 2, data is parity checked when read and may be corrected if one drive fails.

In RAID level 5, data blocks are not split but are written block by block across two or more disks. Parity information is distributed across the same drives. Thus, again, customer data may be recovered in the event of the failure of a single drive. RAID 6 is an extension of RAID 5 and allows recovery from the simultaneous failure of multiple drives through the use of a second, independent, distributed parity scheme. Finally, RAID 10 (or 1-0) combines the mirroring of RAID 1 with data striping. Recovery from multiple simultaneous drive errors may be possible.

The types of errors from which traditionally implemented RAID systems may recover only include those which the RAID controller detects. One common error detectable by the controller is a media error. In certain systems developed and sold by International Business Machines (IBM®), another controller-detectable error is one which is detectable through the use of block LRCs appended to each sector. ("LRC" refers to a longitudinal redundancy check word attached to a block of data and used to ensure that the block is delivered error-free.)

However, other errors may not be detectable by a RAID controller. For example, when the LRCs are generated across multiple sectors, the RAID controller may not able to detect certain errors. The controller may also not be able detect errors in sequence numbers embedded in the data. Another example of an error which may not be detectable by the RAID controller can occur when data is not actually written to one of the drives but the RAID controller, not detecting the failure, directs that the correct parity be written.

While the host or client may be able to detect some errors which the RAID controller does not, there is currently no recovery procedure available. Thus, a need exists to permit recovery of data errors which are not detectable by the RAID controller.

SUMMARY OF THE INVENTION

The present invention provides method, system and computer program product to improve the reliability of data transfers from RAID systems. In one embodiment, a command is transmitted from a host device to a RAID controller to read a block of data from an array of storage drives. The block of data is obtained by the RAID controller from the drives and transmitted to the host. The host determines whether an error is present in the data. If so, the host transmits a second command to the RAID controller to re-read the data in a reconstruct mode. The RAID controller reconstructs the block of data and transmits it to the host.

The first command may include an instruction directing the RAID controller to use a first of a plurality of reconstruct read algorithms and the second command may include an instruction directing the RAID controller to use a second of the plurality of reconstruct read algorithms.

In a further embodiment, the host detects errors in the received reconstructed data. If an error is detected, the host transmits a third command to the RAID controller to re-read the data in a second reconstruct mode.

In still a further embodiment, the first command may include an instruction directing the RAID controller to read a first of two copies of the data and the second command may include an instruction directing the RAID controller to read a second of the two copies.

Additionally, an indication of an error may be provided whereby a faulty drive may be replaced.

DETAILED DESCRIPTION OF THE PREFERRED EMBODIMENT

Figure 1:
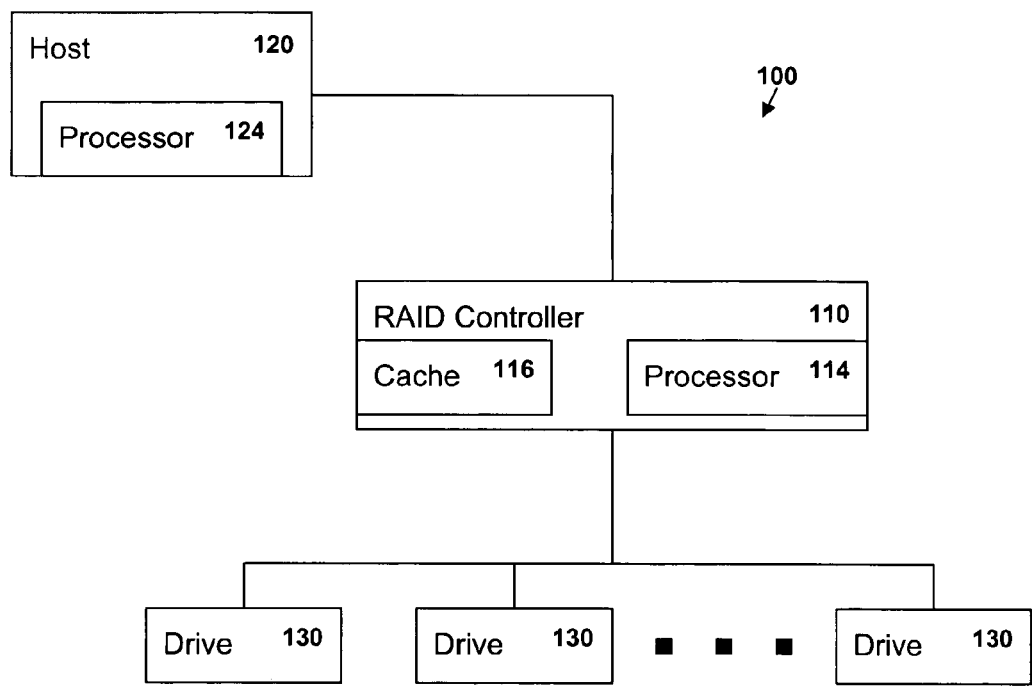
FIG. 1 is a block diagram of a generic RAID system in which the present invention may be implemented.

FIG. 1 is a block diagram of a generic RAID system 100 in which the present invention may be implemented. The system 100 includes a RAID controller 110 coupled to a host or client 120. The controller 110 is also coupled to the RAID disk array 130 itself which includes two or more disk drives. The host 120 includes a processor 124 which executes routines and issues read and write commands to the RAID controller 110. The RAID controller 110 also includes a processor 114 which processes commands received from the host 120 and executes RAID drive management routines. The controller 110 may also include a cache 116 for temporary storage of recently or often accessed customer data.

Figure 2:
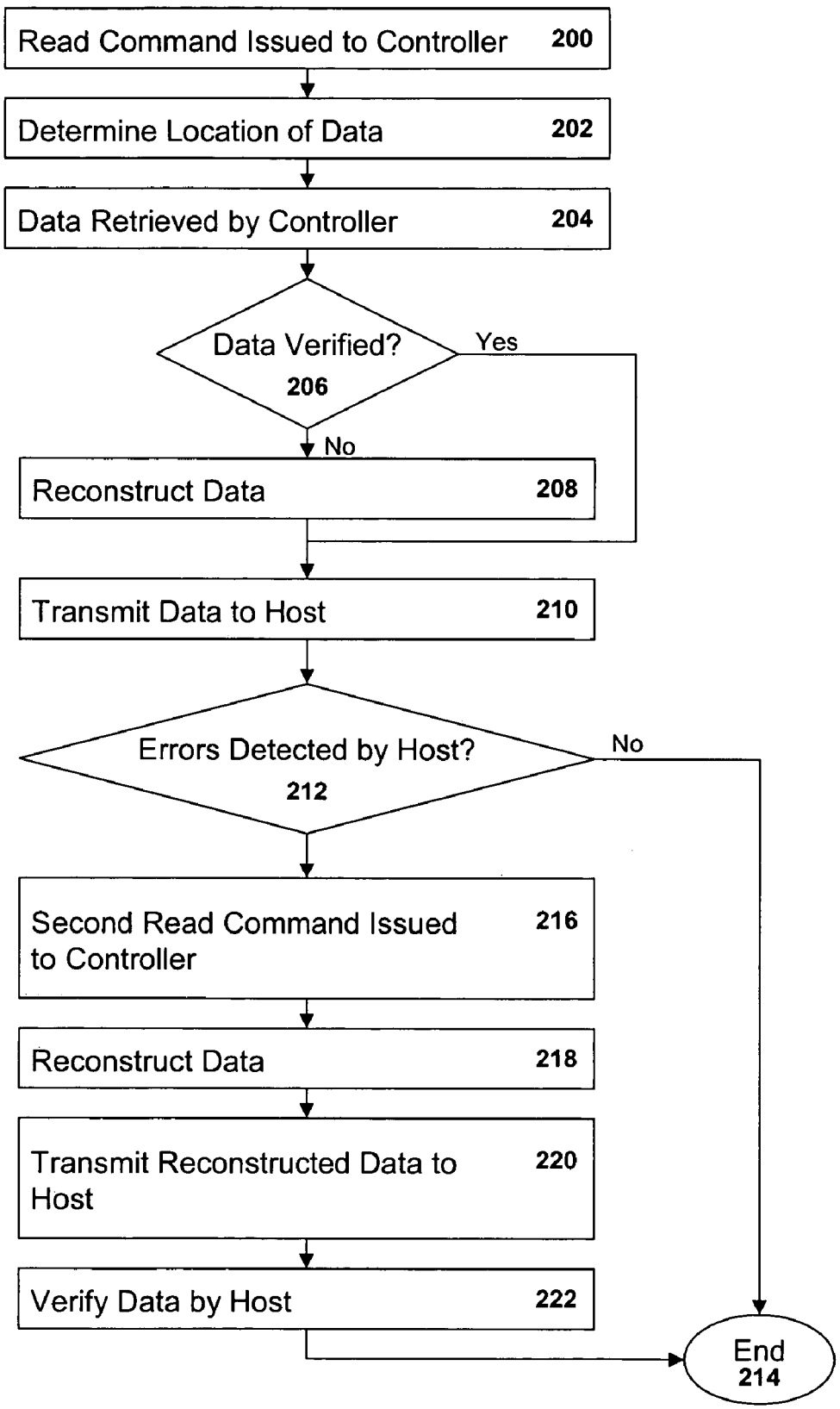
FIG. 2 is a flow chart of an implementation of the present invention.

Referring also to the flow chart of FIG. 2, the host 120 issues a read command to the RAID controller 110 to retrieve specified customer data (step 200). The controller 110 determines the physical location of the data on the drives 130 or in the cache 116 (step 202). After the data is located, it is retrieved (step 204) and verified by the controller 110 (step 206). If an error is detected (such as might be caused by a medium error), the controller 110 "reconstructs" the data using the appropriate RAID algorithm (step 208). In the case of RAID level 1 or 10, the algorithm includes reading the data from another drive. In the case of other RAID levels, the algorithm includes using ECC, parity or another scheme to actually reconstruct the desired data. As used herein, the term "algorithm" will refer to any of these methods and the term "reconstruct" will refer to the process of applying of any of these methods. In the event the reconstruction fails (not shown), the process ends. When the data has been verified or reconstructed, it is transmitted to the host 120 (step 210).

As noted above, however, there are certain type of errors which might escape detection by the RAID controller 110. Consequently, the host 120 also attempts to detect errors in the data received from the controller 110 (step 212). If no errors are detected, the process of the present invention ends (step 214). However, if an error is detected, the host 120 transmits another command to the controller 110 (step 216) to reconstruct the desired data. When this second command is executed, the RAID controller 110 applies the appropriate algorithm (step 218) to reconstruct the data. The controller 110 is not permitted to resend the same, faulty, data, whether from the drives 130 or from the cache 116. The controller 110 then sends the reconstructed data back to the host 120 (step 220) where it is again verified (step 222).

For example, when a RAID 1 or 10 system is used, one of the drives is considered to be the primary drive and the other is considered to be the secondary. However, the designations are typically arbitrary and a conventional read command may return data from either drive or from a combination of the two. In one embodiment of the present invention, the first read command transmitted by the host 120 to the controller 110, may include an instruction to read a specified drive (for example, FF_ReadPrimary). The second command, if required, may then include an instruction to read another specified drive (for example, FF_ReadSecondary). Thus, assuming that the second drive contains different and correct data, it can be assured that incorrect data will not be re-transmitted from the controller 110 to the host 120. It will be appreciated that more advanced RAID systems may be accommodated by the present invention by employing corresponding additional commands.

In a variation of the foregoing procedure, the host 110 may also compare the two sets of read data and determine if either is correct.

As noted above, a RAID 6 system achieves a high degree of fault tolerance through the use of two (or more) RAID algorithms. In another embodiment of the present invention, the first read command transmitted by the host 120 to the controller 110, may include an instruction to apply a specified one of the algorithms. The second command, if required, may then include an instruction to read the data using another algorithm. Thus, if the second algorithm results in correct data, it can be assured that incorrect data will not be re-transmitted from the controller 110 to the host 120.

When a RAID 5 system is used, another embodiment of the present invention may be implemented. In a 3+P RAID 5 system, data blocks are written to three drives and parity for the three blocks is written to a fourth drive. For purposes of this example, the blocks of data may be labeled A, B and C; the parity drive normally will be generated from A xor B xor C. If a data block D is intended to be written to the second drive, it should replace block B. However, occasionally the write operation may fail without the RAID controller 110 detecting the failure. Consequently, the parity will be updated as A xor D xor C while block B remains intact on the second drive. Thus, a read command will return blocks A, B and C, not A, D and C. Such an error may not be detectable by the controller 110. The host 120, however, may detect the error and command the controller 110 to reconstruct the data on the second drive using the parity. The host 120 would then correctly receive blocks A, D and C.

Because it is important to prevent future errors as well as correct for existing drive failures, an error log may be recorded and analyzed to determine which methods of reading the customer data result in obtaining the correct data. The host 120 may also use the error log to isolate a failure in a drive 130. A faulty drive 130 may be replaced after a predetermined number of failures. More likely, it will be desired to replace a drive after the first failure to reduce the probability of a future failure of the same drive and the attendant risk of having two drives fail simultaneously. While some RAID levels are designed to allow recovery from a multi-drive failure, others levels are not and a multi-drive failure could result in the loss of data.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for controlling a RAID subsystem, comprising:
   transmitting a first command to a RAID controller to read a block of data from an array of storage drives;
   receiving the block of data from the RAID controller;
   detecting errors in the block of data received from the RAID controller;
   if an error is detected, transmitting a second command to the controller to perform a first reconstruct read of the block of data; and
   receiving the reconstructed block of data.

2. The method of claim 1, wherein:
   the first command includes an instruction directing the RAID controller to use a first of a plurality of reconstruct read algorithms; and
   the second command includes an instruction directing the RAID controller to use a second of the plurality of reconstruct read algorithms.

3. The method of claim 1, further comprising:
   detecting errors in the reconstructed block of data; and
   if an error is detected in the reconstructed block of data, transmitting a third command to the RAID controller to perform a second reconstruct read of the block of data using an algorithm different from the algorithm used to perform the first reconstruct read.

4. The method of claim 3, wherein:
   the second command includes an instruction directing the RAID controller to read the block of data from a first of two copies of the block of data; and the third command includes an instruction directing the RAID controller to read the block of data from a second of the two copies.

5. The method of claim 1, wherein:
the first command includes an instruction directing the RAID controller to read the block of data from a first of two copies of the block of data; and
the second command includes an instruction directing the RAID controller to read the block of data from a second of the two copies of the block of data.

6. The method of claim 5, further comprising comparing the first read block of data with the reconstructed block of data.

7. The method of claim 1, further comprising, following detection of an error, providing an indication of the error whereby a faulty drive may be replaced.

8. A host computer system coupled to a RAID storage subsystem, comprising:
means for transmitting a first command to a RAID controller to read a block of data from an array of storage drives;
means for receiving the block of data from the RAID controller;
means for detecting errors in the block of data received from the RAID controller;
means for transmitting a second command to the controller to perform a first reconstruct read of the block of data if an error is detected; and
means for receiving the reconstructed block of data.

9. The system of claim 8, wherein:
the means for transmitting the first command includes means for generating an instruction directing the RAID controller to use a first of a plurality of reconstruct read algorithms; and
the means for transmitting the second command includes means for generating an instruction directing the RAID controller to use a second one of the plurality of reconstruct read algorithms.

10. The system of claim 8, further comprising:
means for detecting errors in the reconstructed block of data; and
means for, if an error is detected in the reconstructed block of data, transmitting a third command to the RAID controller to perform a second reconstruct read of the block of data using an algorithm different from the algorithm used to perform the first reconstruct read if an error is detected.

11. The system of claim 10, wherein:
the means for transmitting the second command includes means for generating an instruction directing the RAID controller to read the block of data from a first of two copies of the block of data; and
the means for transmitting the third command includes means for generating an instruction directing the RAID controller to read the block of data from a second of the two copies.

12. The system of claim 8, wherein:
the means for transmitting the first command includes means for generating an instruction directing the RAID controller to read the block of data from a first of two copies of the block of data; and
the means for transmitting the second command includes means for generating an instruction directing the RAID controller to read the block of data from a second of the two copies of the block of data.

13. The system of claim 12, further comprising means for comparing the first read block of data with the reconstructed block of data.

14. The system of claim 8, further comprising, means for providing an indication of the error whereby a faulty drive may be replaced following detection of an error.

15. A computer program product of a computer readable medium usable with a programmable computer, the computer program product having computer-readable code embodied therein for reading data from a RAID subsystem, the computer-readable code comprising instructions for:
transmitting a first command to a RAID controller to read a block of data from an array of storage drives;
receiving the block of data from the RAID controller;
detecting errors in the block of data received from the RAID controller;
if an error is detected, transmitting a second command to the controller to perform a first reconstruct read of the block of data; and
receiving the reconstructed block of data.

16. The computer program product of claim 15, wherein:
the first command includes an instruction directing the RAID controller to use a first of a plurality of reconstruct read algorithms; and
the second command includes an instruction directing the RAID controller to use a second one of the plurality of reconstruct read algorithms.

17. The computer program product of claim 15, further comprising instructions for:
detecting errors in the reconstructed block of data; and
if an error is detected in the reconstructed block of data, transmitting a third command to the RAID controller to perform a second reconstruct read of the block of data using an algorithm different from the algorithm used to perform the first reconstruct read.

18. The computer program product of claim 17, wherein:
the second command includes an instruction directing the RAID controller to read the block of data from a first of two copies of the block of data; and
the third command includes an instruction directing the RAID controller to read the block of data from a second of the two copies.

19. The computer program product of claim 15, wherein:
the first command includes an instruction directing the RAID controller to read the block of data from a first of two copies of the block of data; and
the second command includes an instruction directing the RAID controller to read the block of data from a second of the two copies of the block of data.

20. The computer program product of claim 19, further comprising instructions for comparing the first read block of data with the reconstructed block of data.

21. The computer program product of claim 15, further comprising instructions for providing an indication of the error whereby a faulty drive may be replaced following detection of an error.

22. The RAID subsystem of claim 21, wherein:
the first command includes an instruction directing the RAID controller to use a first of a plurality of reconstruct read algorithms; and
the second command includes an instruction directing the RAID controller to use a second one of the plurality of reconstruct read algorithms.

23. The RAID subsystem of claim 22, wherein:
the first command includes an instruction directing the RAID controller to read the block of data from a first of two copies of the block of data; and
the second command includes an instruction directing the RAID controller to read the block of data from a second of the two copies of the block of data.

24. The RAID subsystem of claim 23, the processor further programmed with instructions for comparing the first read block of data with the reconstructed block of data.

25. The RAID subsystem of claim 22, the processor further programmed with instructions for providing an indication of the error whereby a faulty drive may be replaced following detection of an error.

26. The RAID subsystem of claim 21, the processor further programmed with instructions for receiving a third command from the host device to perform a second reconstruct read of the block of data using an algorithm different from the algorithm used to perform the first reconstruct read if an error is detected in the reconstructed block of data.

27. The RAID subsystem of claim 26, wherein:
the second command includes an instruction directing the RAID controller to read the block of data from a first of two copies of the block of data; and
the third command includes an instruction directing the RAID controller to read the block of data from a second of the two copies.

28. A RAID subsystem, comprising:
a plurality of RAID storage drives;
a RAID controller coupled to the RAID storage drives and to a host device; and
a processor programmed with instructions for:
receiving a first command from the host device to read a block of data from an array of storage drives;
obtaining the block of data from the RAID drives;
transmitting the block of data to the host device;
if the host device detects an error in the transmitted block of data, receiving a second command from the host device to perform a first reconstruct read of the block of data;
obtaining the reconstructed block of data from the RAID drives; and
transmitting the reconstructed block of data to the host device.

* * * * *